US010019288B2

(12) United States Patent
Kung et al.

(10) Patent No.: US 10,019,288 B2
(45) Date of Patent: Jul. 10, 2018

(54) FAST AND STABLE MECHANISM FOR ALLOCATING CONTIGUOUS MEMORY

(71) Applicant: MediaTek Inc., Hsinchu (TW)

(72) Inventors: Ching-Fu Kung, Taoyuan (TW); Sheng-Yu Chiu, Kaohsiung (TW)

(73) Assignee: MediaTek, Inc., Hsinchu (TW)

( * ) Notice: Subject to any disclaimer, the term of this patent is extended or adjusted under 35 U.S.C. 154(b) by 38 days.

(21) Appl. No.: 15/262,710

(22) Filed: Sep. 12, 2016

(65) Prior Publication Data

US 2018/0074863 A1   Mar. 15, 2018

(51) Int. Cl.
| | |
|---|---|
| *G06F 9/50* | (2006.01) |
| *G06F 12/02* | (2006.01) |
| *G06F 9/455* | (2018.01) |
| *G06F 3/06* | (2006.01) |
| *G06F 12/00* | (2006.01) |
| *G06F 12/06* | (2006.01) |

(52) U.S. Cl.
CPC .......... *G06F 9/5016* (2013.01); *G06F 3/0604* (2013.01); *G06F 3/0631* (2013.01); *G06F 3/0662* (2013.01); *G06F 9/45558* (2013.01); *G06F 12/00* (2013.01); *G06F 12/02* (2013.01); *G06F 12/023* (2013.01); *G06F 12/0223* (2013.01); *G06F 12/0292* (2013.01); *G06F 12/06* (2013.01); *G06F 2009/4557* (2013.01); *G06F 2009/45583* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 9,389,895 B2 | 7/2016 | Oshins et al. | |
| 2004/0064601 A1* | 4/2004 | Swanberg | G06F 12/1081 710/22 |
| 2015/0261590 A1 | 9/2015 | Sperber et al. | |

FOREIGN PATENT DOCUMENTS

TW         201621632 A        6/2016

OTHER PUBLICATIONS

Michal Nazarewicz, "A Deep Dive into CMA", downloaded from lwn.net/Articles/486301/, Mar. 14, 2012.

* cited by examiner

*Primary Examiner* — Midys Rojas
(74) *Attorney, Agent, or Firm* — Tong J. Lee

(57) ABSTRACT

A hypervisor hosted by a computing system performs a method to allocate a contiguous physical memory space to a device. A given region of physical memory is marked as migratable. From an operating system (OS) kernel, the hypervisor receives a request for memory allocation to the device, the request indicating a first set of available virtualized pages in a virtualized memory. In response to the request, the hypervisor identifies a set of contiguous frames in the given region to be allocated to the device. The set of contiguous frames are mapped to a second set of virtualized pages. The hypervisor disables the mapping for the first set of available virtualized pages and the second set of virtualized pages. Then one or more occupied frames in the set of contiguous frames are migrated out of the given region to allow for allocation of the set of contiguous frames to the device.

22 Claims, 9 Drawing Sheets

FAST AND STABLE MECHANISM FOR ALLOCATING CONTIGUOUS MEMORY

TECHNICAL FIELD

Embodiments of the invention relate to memory allocation in a computing system.

BACKGROUND

A modern computer system typically uses a memory management unit (MMU) for translating virtual addresses to physical addresses for its central processing unit (CPU). When an application program requests a contiguous range of virtual memory, the MMU can map the range of virtual addresses to scattered physical memory addresses that are available for allocation. A modern computer system generally includes devices that need a contiguous range of memory in the device address space for operation. For example, a camera needs a memory buffer for its operation. Some systems use a scatter-gatherer or an input-output MMU (IOMMU) to collect fragmented physical memory blocks into contiguous memory blocks in the device address space. Thus, large regions of memory in the device address space can be allocated without the need to be contiguous in physical memory.

Various devices in embedded systems have neither scatter-gatherer nor IOMMU support. As such, these devices require contiguous blocks of physical memory to operate. Examples of such devices include, but are not limited to cameras, hardware video decoders and encoders, etc. Some of these devices require buffers with large contiguous physical memory. For instance, a full high-definition (HD) frame is more than two mega pixels in size, which needs more than 6 megabytes of memory to store. Because of memory fragmentation, such a large chunk of contiguous physical memory is very unlikely to be available after the system executes a period of time.

Some embedded devices impose additional requirements on the buffers, e.g., they can operate only with buffers allocated in a particular location or memory bank (if the system has more than one memory bank), or buffers aligned to a particular memory boundary. This also adds additional complexity to the memory allocation algorithm in operating systems.

Some operating systems provide memory allocation functions for applications or drivers to acquire contiguous physical memory regions. One example is the Linux® Contiguous Memory Allocator (CMA), which runs in an operating system kernel to allow allocation of contiguous physical memory blocks.

The problem of CMA is scalability. Multiple kernel subsystems or multiple virtualized environments (e.g., virtual machines) may run concurrently in a system. When a physically contiguous memory region is requested through CMA APIs, CMA starts migrating all occupied memory pages in this region to other free memory space. However, some memory pages may be locked or used by other processes, and CMA needs to maintain and keep track of page state when performing the page migration process. Thus, a high degree of page synchronization among different subsystems or virtual machines may be necessary. Due to such a complex synchronization mechanism handled by CMA, CMA allocation time becomes more and more inefficient and unstable when the requested memory region size grows. Thus, CMA may sometimes fail to meet the latency requirement of some applications, such as video playback.

SUMMARY

In one embodiment, a method of a hypervisor hosted by a computing system is provided for allocating a contiguous physical memory space to a device. The method comprises: marking a given region of physical memory as migratable; receiving a request from an operating system (OS) kernel for memory allocation to the device, the request indicating a first set of available virtualized pages in a virtualized memory; identifying a set of contiguous frames in the given region to be allocated to the device, the set of contiguous frames being mapped to a second set of virtualized pages; disabling, by the hypervisor, mapping for the first set of available virtualized pages and the second set of virtualized pages; and after disabling the mapping, migrating one or more occupied frames in the set of contiguous frames out of the given region to allow for allocation of the set of contiguous frames to the device.

In one embodiment, a system is provided to allocate a contiguous physical memory space to a device. The system comprises: one or more processors that host one or more virtual machines managed by a hypervisor; a physical memory; and one or more devices coupled to the one or more processors and the physical memory. The hypervisor is operative to: mark a given region of the physical memory as migratable; receive a request from an operating system (OS) kernel for memory allocation to the device, the request indicating a first set of available virtualized pages in a virtualized memory; identify a set of contiguous frames in the given region to be allocated to the device, the set of contiguous frames being mapped to a second set of virtualized pages; disable mapping for the first set of available virtualized pages and the second set of virtualized pages; and after disabling the mapping, migrate one or more occupied frames in the set of contiguous frames out of the given region to allow for allocation of the set of contiguous frames to the device.

According to embodiments described herein, a hypervisor performs allocation and de-allocation of a contiguous physical memory such that guest operating systems are not burdened by such tasks. Moreover, occupied frames in the contiguous physical memory are migrated in a fast and stable manner. The method of the hypervisor can also be applied to on-demand secure memory allocation, such that physical memory can be shared between both the normal world and the secure world.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The terms "memory" and "system memory," unless specified otherwise, refer to a physical memory having a physical address (PA) space. The term "virtualized memory" refers to an address space (i.e., the intermediate physical address (IPA) space) in which virtual machines (VMs) operate. The term "virtual memory" refers to an address space (i.e., virtual address (VA) space) in which processes (e.g., applications) operate. Moreover, the term "mapping", unless specified otherwise, refers to the use of a data structure, such as a page table, to associate a memory block in one address space to another address space.

Embodiments of the invention provide a memory allocation mechanism which leverages memory virtualization and two stages of address translation. The allocation is fast and stable even when a large memory size is requested. In one embodiment, a hypervisor, also known as a virtual machine monitor, performs the allocation of a contiguous region of physical memory from a migratable zone of the memory. If one or more frames in that contiguous region have been occupied (i.e., have been allocated previously), the hypervisor migrates these occupied frames out of the migratable zone to make the contiguous region available for allocation. As such, guest operating systems (i.e., operating systems of VMs) are shielded from the complex page synchronization tasks among different kernel sub-systems.

Figure 1:
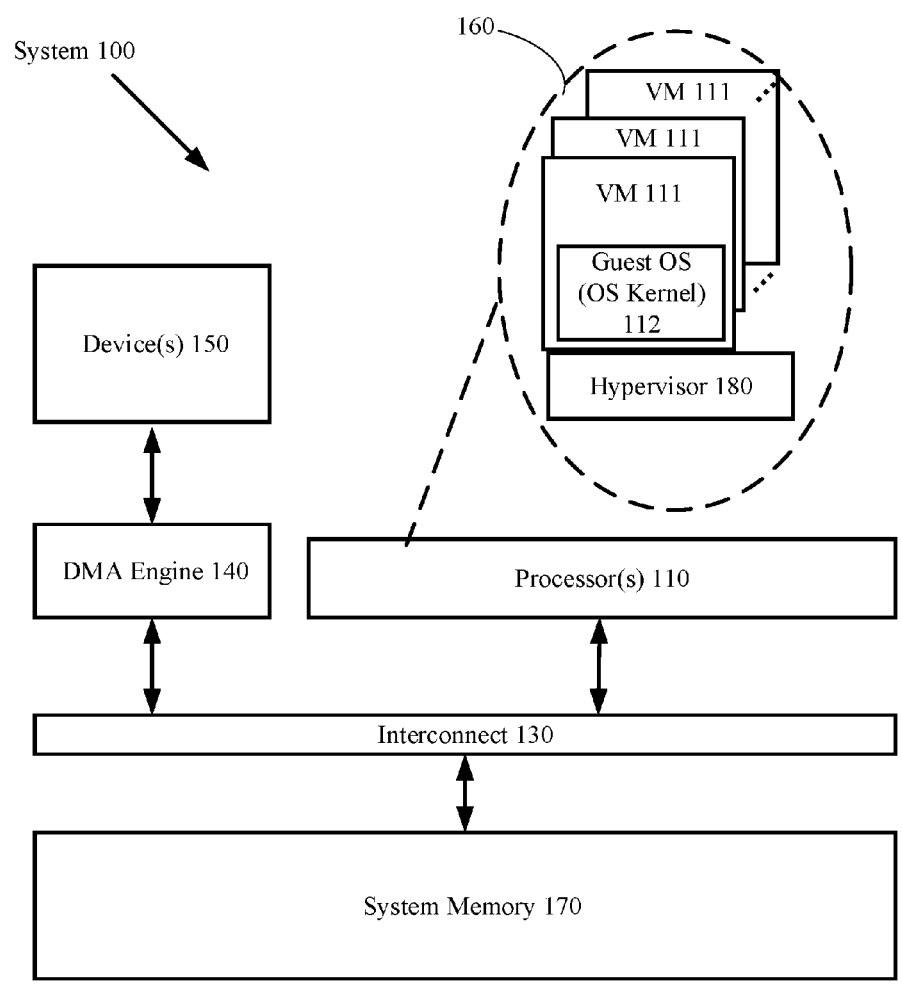
FIG. 1 illustrates a system operating in an virtualized environment according to one embodiment.

FIG. 1 illustrates a system 100 operating in an virtualized environment according to one embodiment. The system 100 includes one or more processors 110 (e.g., central processing units (CPUs)), which are coupled to a system memory 170 (e.g., Dynamic Random Access Memory (DRAM) or other volatile or non-volatile random-access memory) via an interconnect 130. The system 100 also includes one or more devices 150 (also referred to as "physical devices"). Examples of the devices 150 include, but are not limited to: audio/video devices, network interface devices, printers, graphics modules, cameras, video decoders, crypto engines, etc. In one embodiment, the devices 150 are coupled to the interconnect 130 via a direct memory access (DMA) engine 140. It is understood that many other system components are omitted herein for simplicity of illustration.

In one embodiment, the system 100 may be part of a mobile computing and/or communication device (e.g., a smartphone, a tablet, a laptop, etc.). In another embodiment, the system 100 may be part of server computer.

The system 100 runs a plurality of software modules, an example of which is shown in a dotted ellipse 160. In one embodiment, one or more of the CPUs 110 may host a number of VMs 111. Each VM 111 runs a guest operating system (OS) 112; different VMs 111 may run the same or different guest OSs 112. The guest OS 112 is also referred to as the OS kernel. The CPUs 110 also hosts a hypervisor 180, which emulates the underlying hardware for the VMs 111 and manages system resources. The hypervisor 180 may also be known as a virtual machine monitor (VMM). In one embodiment, the hypervisor 180 may be part of a host OS that runs on the system 100.

In one embodiment, the DMA engine 140 performs DMA transactions on behalf of the devices 150. In one embodiment, each device 150 may be allocated with an address range of the system memory 170, which specifies a memory region used as a DMA buffer for the device 150 to directly transfer data to and from a given VM 111. The DMA buffer contains a contiguous memory region in the physical address space, which further includes one or more fixed-size memory blocks (e.g., a 4K-byte per block).

Figure 2:
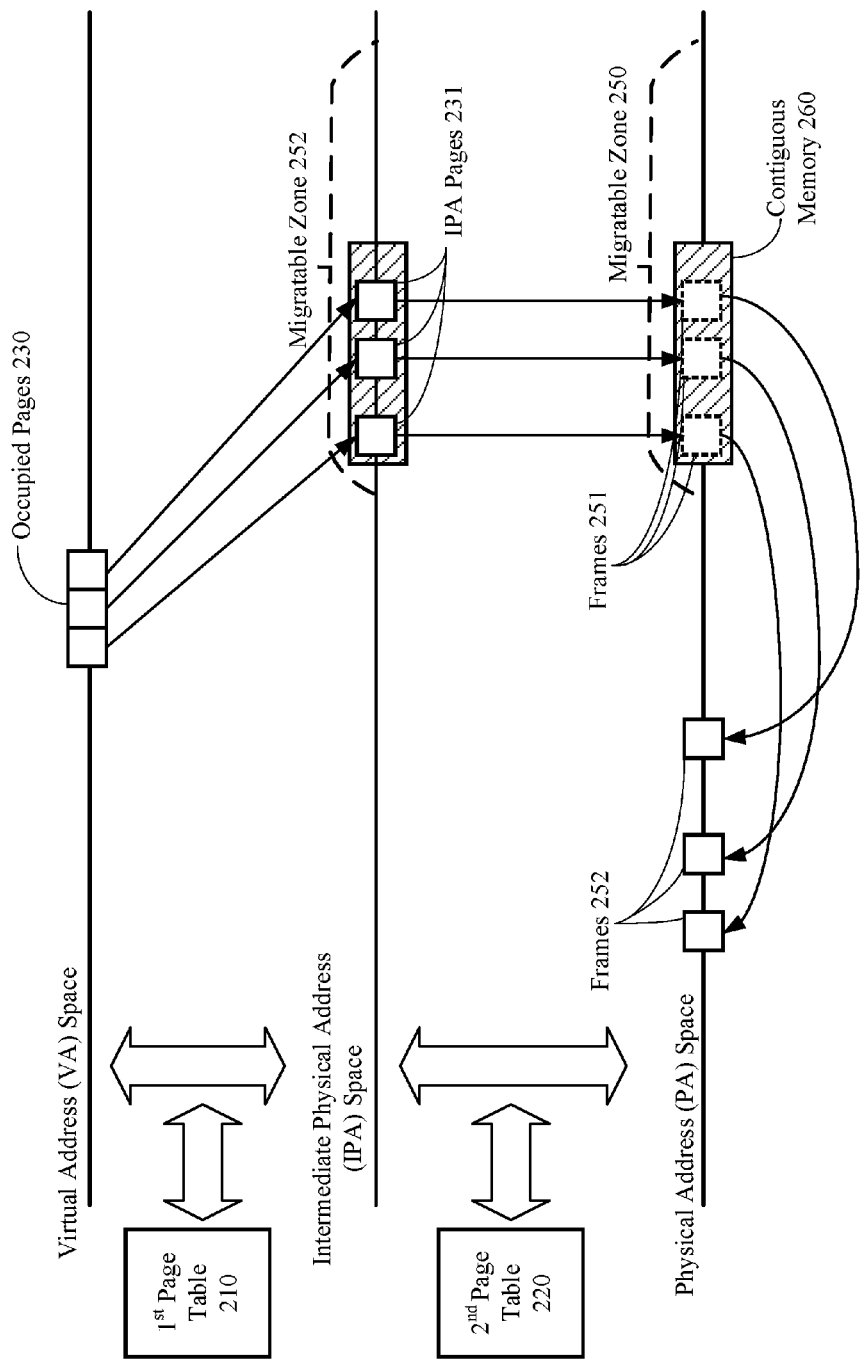
FIG. 2 illustrates a two-stage address translation according to one embodiment.

FIG. 2 illustrates a two-stage address translation according to one embodiment. The first-stage address translation is between a virtual address (VA) space and an Intermediate Physical Address (IPA) space. Referring also to FIG. 1, each process that runs on a VM 111 of FIG. 1 is assigned a private address space called the VA space. The VA space is divided into small blocks, and each block is called a page. The IPA space is also divided into small blocks, and each block is called an IPA page. Each VM 111 is allocated a set IPA pages as its virtualized memory. The address translation between the VA space of a process and the IPA space is performed by the guest OS 112 on which the process runs, according to a first page table 210 managed by the guest OS 112. The first page table 210, also known as the first-stage page table, has multiple entries; each entry describes the mapping between a page and a corresponding IPA page. In one embodiment, one or more of the entries in the first page table 210 may be set to "no_map," which means that the corresponding page is not accessible by any process. In one embodiment, the guest OS 112 may use different first page tables 210 for different processes to isolate the memory space between these processes.

The second-stage address translation extends the memory isolation among different VMs. The second-stage address translation is between the IPA space and the physical address (PA) space, according to a second page table 220. The second page table 220, also known as the second-stage page table, is managed by the hypervisor 180. In one embodiment, one or more of the entries in the second page table 220 may be set to "no_map," which means that the hypervisor 180 forbids a VM to access some of its IPA pages. The hypervisor 180 enforces memory isolation between different VMs by mapping IPA pages of different VMs to different frames in the PA space. In one embodiment, the address mapping between the IPA space and the PA space is an identical mapping; that is, the IPA page number is identical to the frame number. In another embodiment, the address mapping between the IPA space and the PA space is such that adjacent pages in the IPA space are mapped to adjacent pages in the PA space. In yet another embodiment, the address mapping between the IPA space and the PA space is performed according to a predetermined one-to-one mapping function. Although identical mapping is described and shown as an example in the following description and figures, it is understood that the mapping between the IPA space and the PA space is not so limited.

The embodiment of FIG. 2 illustrates a migratable zone 250, which is a contiguous portion of the physical memory in which all of the frames can be migrated to other parts of the physical memory. Migration is a process of copying the content of a frame to some other parts of the memory and updating all references to the frame. After the frame content is migrated, the old frame is freed for reuse. The embodiment of FIG. 2 shows that the migratable zone 250 in the PA space is mapped to a contiguous migratable zone 252 in the IPA space. In an alternative embodiment, the corresponding migratable zone 252 in the IPA space is not necessary contiguous if an alternative mapping function between the IPA space and the PA space is used.

FIG. 2 also illustrates an example of a two-stage mapping, in which three occupied pages 230 in the VA space are mapped into the migratable zone 252 in the IPA space (as the IPA pages 231), and, due to the identical mapping, also mapped into the migratable zone 250 in the PA space (as the frames 251). When one of the devices 150 of FIG. 1 requests the allocation of a contiguous region of physical memory, the hypervisor 180 may identify a contiguous memory 260 in the migratable zone 250. Assume that all frames in the contiguous memory 260 are free for allocation except for the three frames 251. Before the hypervisor 180 can allocate the contiguous memory 260, the hypervisor 180 migrates the frames 251 to another part of the PA space; e.g., as frames 252. Then the contiguous memory 260 is available for allocation to the requesting device 150.

Figure 3:
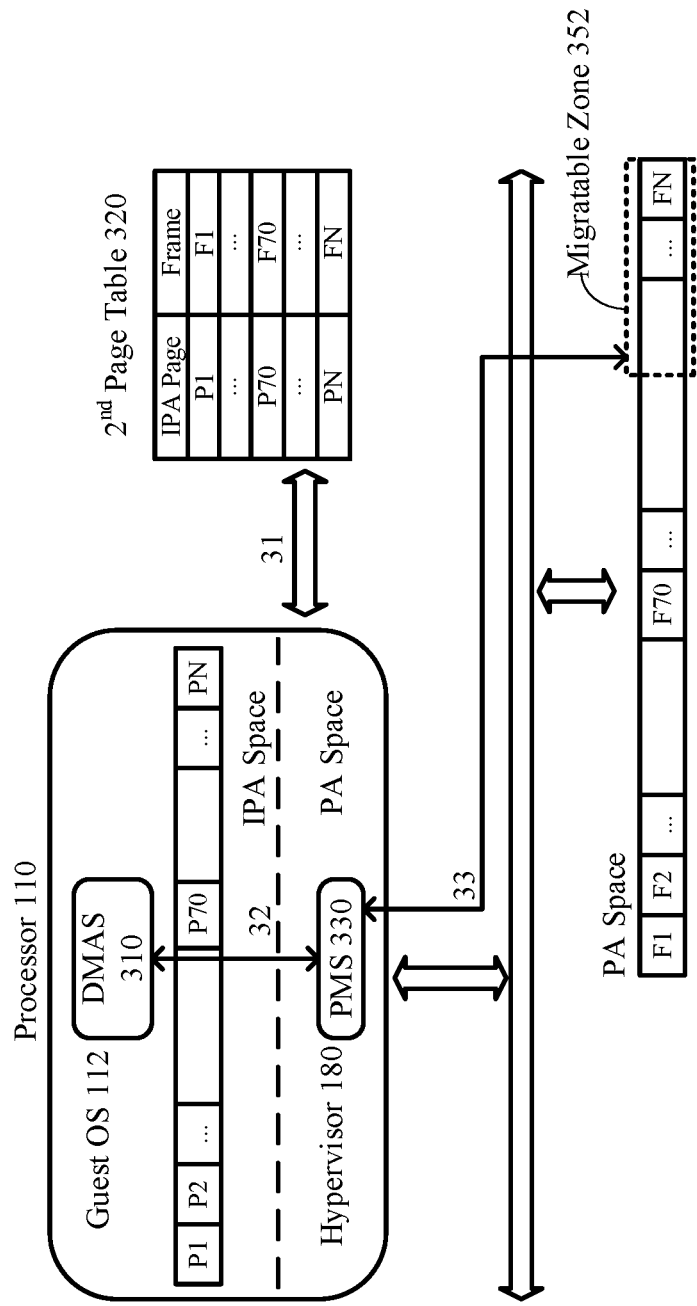
FIG. 3 illustrates a system initialization process according to one embodiment.

FIG. 3 is a diagram illustrating an initialization process of the system 100 according to one embodiment. Referring also to the system 100 of FIG. 1, the hypervisor 180 is booted before the guest OS 112 at system initialization. The hypervisor 180 determines how many frames are assigned to the guest OS 112; e.g., N frames. At step 31, the hypervisor 180 initializes an identically-mapped second page table 320 for the guest OS 112 to map addresses in the IPA space to the PA space. This IPA space is referred to as the virtualized memory, which is used and managed by the guest OS 112.

After guest OS 112 is booted, at step 32, a DMA Memory Allocation Service (DMAS) 310 in the guest OS 112 marks a region in the virtualized memory as migratable, and informs a Page Migration Service (PMS) 330 in the hypervisor 180 of the location of the migratable zone; e.g., by passing on the IPA addresses of the migratable zone. At step 33, the PMS 330 marks a corresponding region in the physical memory as a migratable zone 352, which will be used as its physical memory pool for allocating contiguous physical memory (shown as a dotted rectangle in FIG. 3). The migratable zone 352 is not reserved by the DMAS 310; it can be used by other services and applications executed on the guest OS 112. After the system initialization is completed, device drivers can request contiguous physical memory regions as DMA buffers from the DMAS 310.

The embodiment of FIG. 3 illustrates an example in which the location of the migratable zone 352 is determined based on the information sent by the guest OS 112. In alternative embodiments, the hypervisor 180 or other system software (e.g., a bootloader) may generate information such that the location of the migratable zone 352 can be determined.

Figure 4:
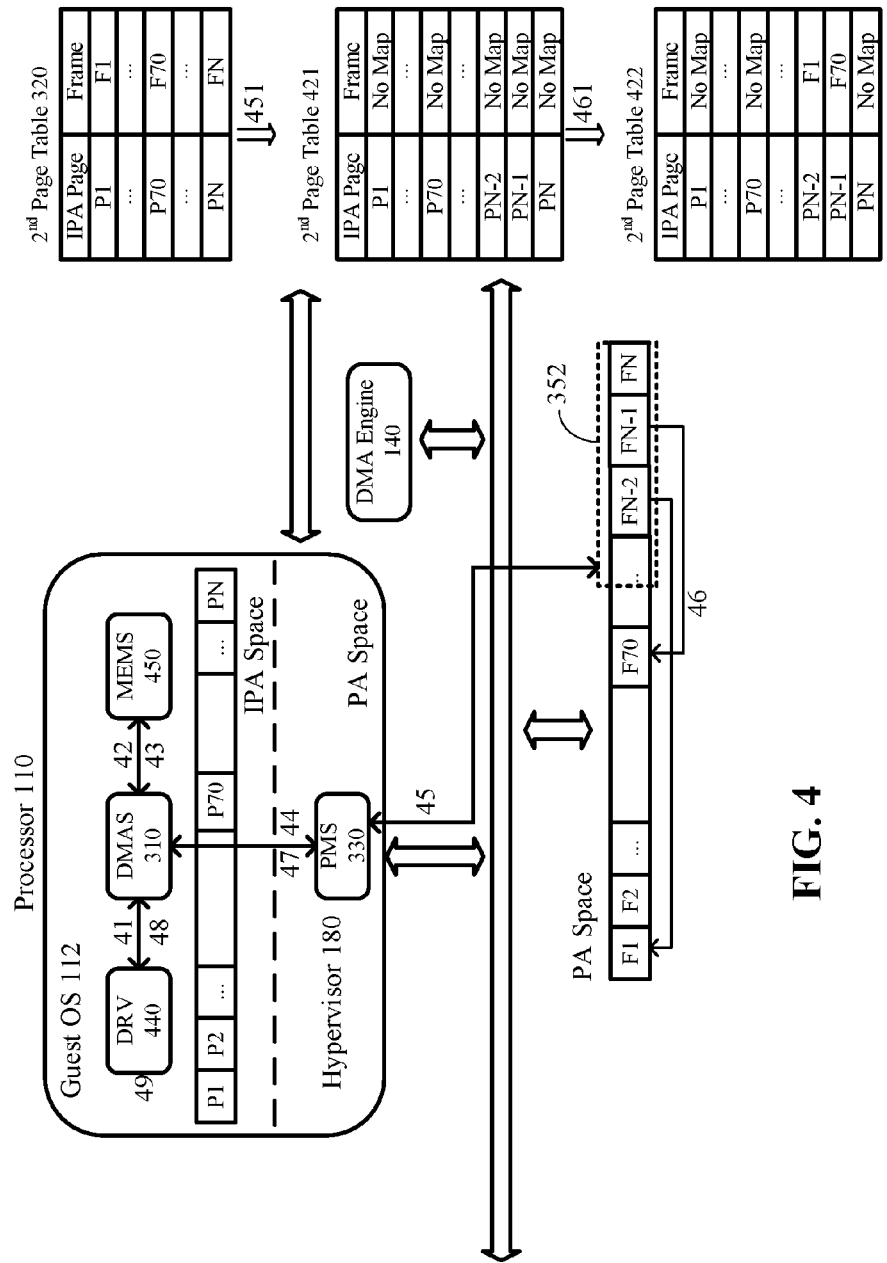
FIG. 4 illustrates an allocation process of a contiguous physical memory region according to one embodiment.

FIG. 4 illustrates an allocation process of a contiguous physical memory region according to one embodiment. In this embodiment, the contiguous physical memory region is used as a DMA buffer; it is understood that the contiguous physical memory region may be used for different purposes that are not limited to DMA buffers. At step 41, a Device Driver (DRV) 440 requests the DMAS 310 to allocate a contiguous region of memory to be used as a DMA buffer, and waits for a response. The request specifies the size of the DMA buffer (e.g., three pages). At step 42, the DMAS 310 sends a request to a Memory Allocator (MEMS) 450 in the guest OS 112 to allocate available pages in the virtualized memory. The MEMS 450 allocates the requested number of available pages from its memory pool (e.g., P1, P70, and PN). At step 43, the MEMS 450 returns the allocated pages to the DMAS 310. At step 44, the DMAS 310 places the allocated pages to a page list, and sends a migration request to the PMS 330 in the hypervisor 180 with the requested DMA buffer size and the page list as arguments. The DMAS 310 then waits for a response.

At step 45, the PMS 330 chooses a contiguous target memory region (e.g., FN-2, FN-1 and FN) from its physical memory pool 352, which is sufficient to fit the requested DMA buffer size. The PMS 330 places the page list from the DMAS 310 to a destination list, and adds all frames in the target memory region to a source list. In the example of FIG. 4A, the initial values in each list are: source list=[FN-2, FN-1, FN], destination list=[F1, F70, FN], and no_migration list=[ ].

The PMS 330 performs a sub-step 451 of step 45 to prepare for page migration. At sub-step 451, the PMS 330 removes all IPA to PA mapping for all frames in the source list, the destination list and the no_migration list by setting corresponding entries to no_map to update the second page table 320 to the second page table 421. Moreover, for each frame in both the source list and the destination list, the PMS 330 removes the frame from the source list and the destination list, and then add that removed frame to the no_migration list.

After the above operations, the source list becomes [FN-2, FN-1], the destination list becomes [F1, F70] and the no_migration list becomes [FN]. The guest OS 112 is forbidden from access to the frames in the source list, the destination list and the no_migration list; more specifically, any access to these frames would cause a "page fault" and trap to the hypervisor 180. The PMS 330 freezes the access to these frames until the page migration is completed, by disabling the mapping for these frames in the second page table 421. In one embodiment, the mapping for a frame can be disabled by setting the frame entry in the page table to no_map or another indicator of disabled mapping. The PMS 330 keeps the source, destination and no_migration lists for later, as these lists will be used when the DMA buffer is released.

The PMS 330 at this point is ready to perform page migration. At step 46, the PMS 330 copies the content of frames in the source list to the corresponding frame in the destination list (e.g., copy FN-2 to F1, and copy FN-1 to F70). After the migration, F1 has the contents of FN-2, and F70 has the contents of FN-1.

The step 46 includes a sub-step 461, at which the PMS 330 updates the second page table 421 to the second page table 422 such that the frames in the destination list (e.g., F1 and F70) are mapped to the IPA pages of the corresponding frames in the source list (e.g., FN-2 and FN-1). This mapping allows the guest OS 112 to regain access to those frames (e.g., F1 and F70) through the virtualized memory. It is noted that the layout of the virtualized memory is unchanged after the migration; thus, the guest OS 112 is unaware of the migration of the frames.

At step 47, the target memory region is available for use now; the PMS 330 marks the region as allocated. The PMS 330 packs the source list, the destination list, the no_migration list and the target memory region into a data structure, and appends the data structure to allocated memory list. Finally, the PMS 330 returns the physical address of the target memory region to the DMAS 310. At step 48, the DMAS 310 forwards the DMA buffer physical address to the DRV 440. After the DRV 440 receives the DMA buffer physical address at step 49, it can use this buffer as a communication channel with hardware devices (e.g., through the DMA engine 140).

Figure 5:
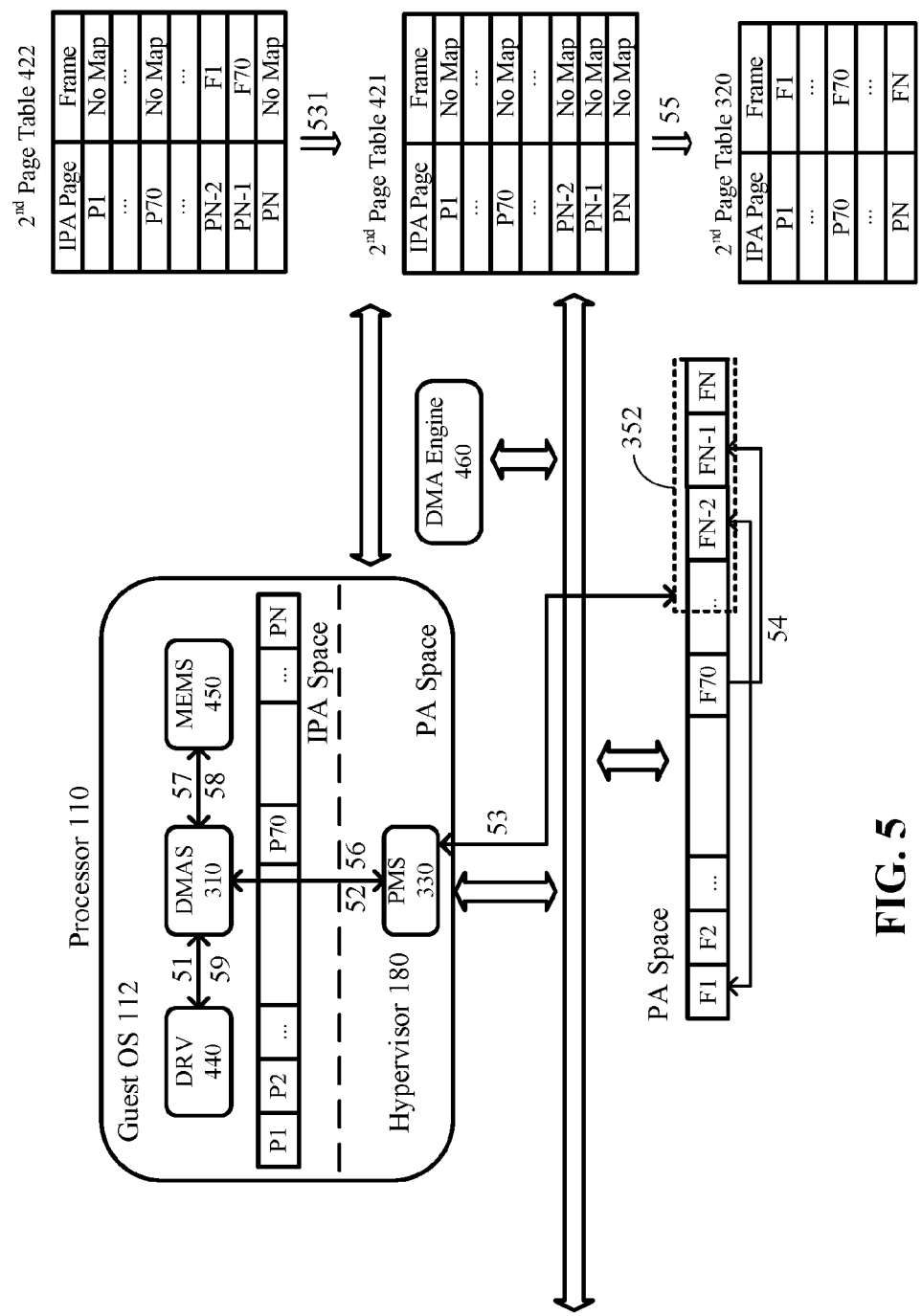
FIG. 5 illustrates a release process according to one embodiment.

FIG. 5 is a diagram illustrating a release process of the DMA buffer allocated in FIG. 4 according to one embodiment. At step 51, the DRV 440 sends the DMA buffer physical address to the DMAS 310. At step 52, the DMAS 310 forwards the DMA buffer physical address to the PMS 330. The PMS 330 searches the address in the allocated memory list, and at step 53 identifies the target memory region as matching the requested address. Then, the PMS 330 extracts the source, destination and no_migration lists for the target memory region. At sub-step 531, the PMS 330 removes the mapping to the frames in the source, destination and no_migration lists from the second page table 422, resulting in the second page table 421. At step 54, the PMS 330 copies content of the frames from the destination list to the source list, and at step 55, re-constructs the mapping between the IPA space and the PA space based on the frames in source, destination and no_migration list to restore the second page table 320.

At step 56, the PMS 330 reports success to the DMAS 310, and at step 57, the DMAS 310 sends a request to the MEMS 450 to release the discrete frames (e.g., P1, P70 and PN) in the virtualized memory. At step 58, the MEMS 450 releases those frames and reports success to the DMAS 310. At step 59, the DMAS 310 reports success to the DRV 440.

It is noted that the second page tables 320, 421 and 422 in FIG. 4 and FIG. 5 are different instances (or snapshots) of the same page table data structure that is managed by the hypervisor 180.

The above description explains the processes for acquiring and releasing a contiguous physical memory region. In some embodiments, the aforementioned processes may be used for on-demand allocation of secure memory. Nowadays, more and more applications of smart phones or tablet computers need to be executed in an isolated and secured environment. For example, Digital Right Management (DRM) uses an access control technology to protect premium content from being accessed by unlicensed users. Applications executed in a secured environment usually have its own secure memory regions, which is protected and inaccessible from other applications in the system.

Figure 6:
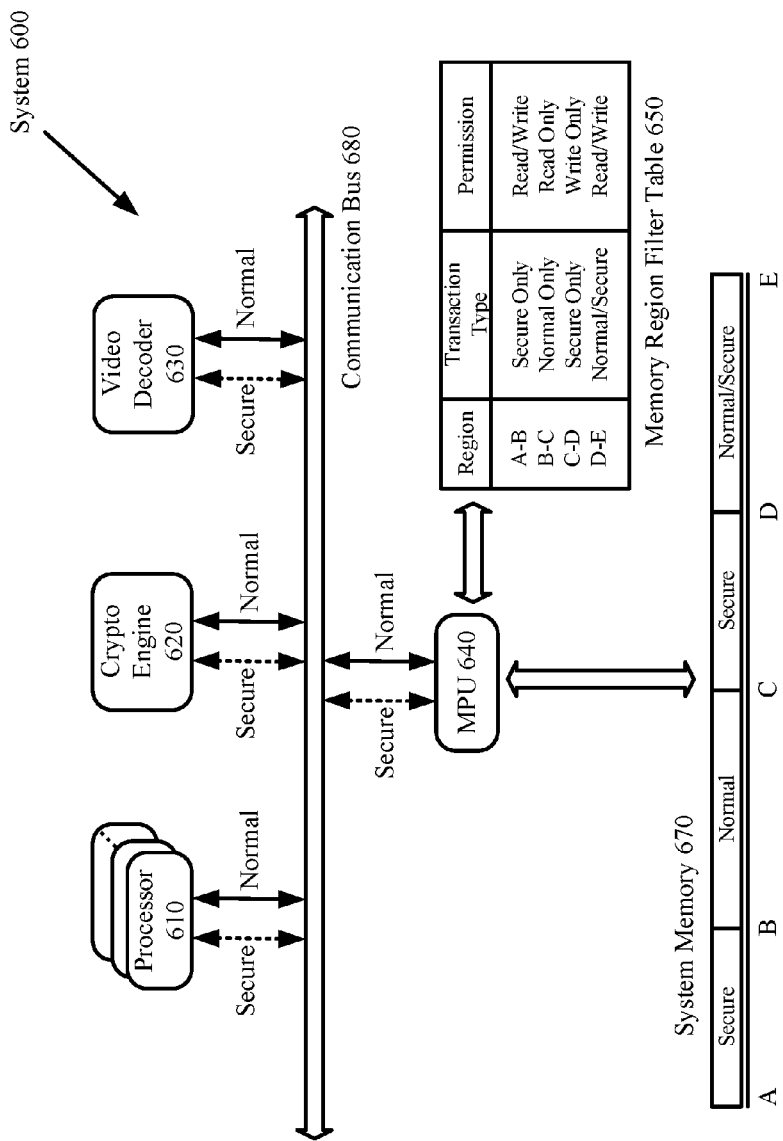
FIG. 6 illustrates a system in which secure memory regions and normal memory regions are isolated according to one embodiment.

FIG. 6 illustrates a system 600 in which secure memory regions and normal memory regions are isolated according to one embodiment. The system 600 is one example of the system 100 of FIG. 1. The system 600 includes one or more processors 610, each of which is an example of the processors 110 of FIG. 1. Each processor 610 can operate in two execution environments: the normal world and the secure world. When the processor 610 executes a program in the normal world, it issues normal bus transactions to access a system memory 670 or device registers. When the processor 610 executes a program in the secure world, it can issue normal or secure bus transactions.

The processors 610 are an example of bus masters. A bus master is a device which has the ability to issue bus transactions to access external memory. Examples of bus masters include, but are not limited to, the processors 610, a crypto engine 620 and a video decoder 630. In the system 600, the bus masters conduct bus transactions over a communication bus 680. In general, each of the bus masters provides two types of device registers: normal registers and secure registers. Normal registers can be accessed by normal bus transactions, while secure registers can be accessed by secure bus transactions only. When a bus master receives a job from secure registers, it starts the secure job and may issue a series of secure bus transactions. The system 600 further includes a Memory Protection Unit (MPU) 640, which is responsible for filtering out illegal memory access according to bus transaction modes and the configurations of a memory region filter table 650. The filter table entries are generally very limited due to cost. In some embodiments, the filter table 650 may contain only 8~16 entries, which means that it can only describe access permissions of 8~16 contiguous memory regions.

To prevent unauthorized users accessing premium content in DRM applications, the system 610 places decrypted video stream and decoded frames in the isolated secure memory. As the density of premium content increases, the size of isolated secure memory is also increased. For Ultra High Density (UHD) with 4K video streaming resolution, the secure memory size is typically larger than 512 MB. To provide such a large isolated memory, one conventional method is to preserve a memory region at system boot time, and protect that memory region via the memory region filter table 650. However, such a protected memory region cannot be used by other applications, which causes low memory utilization.

Figure 7:
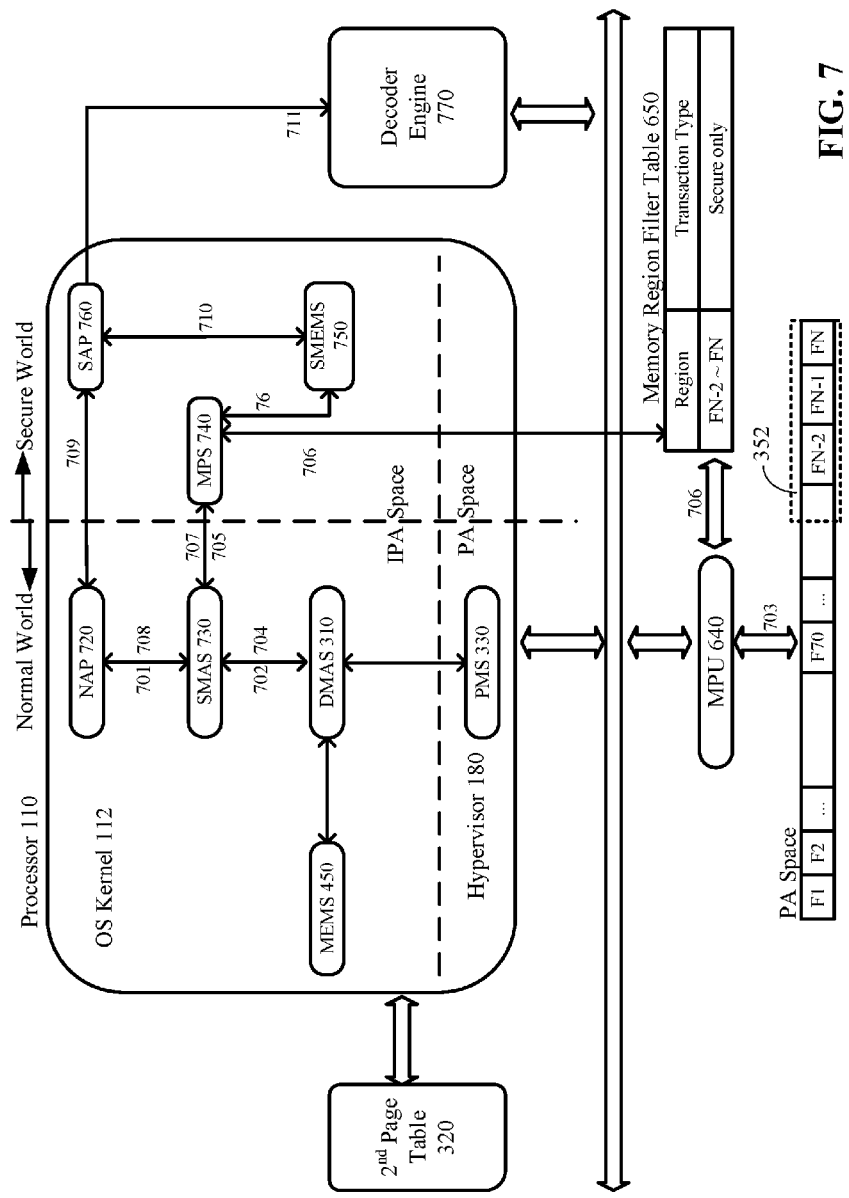
FIG. 7 illustrates an allocation process of a secure memory region according to one embodiment.

According to an embodiment of the invention, the system 600 may on demand allocate contiguous frames from the normal memory region, and protect the allocation using the memory region filter table 650. FIG. 7 is diagram illustrating an allocation process of a secure memory region based on the approach described in connection with FIG. 4 according to one embodiment.

At step 701, a Normal World Application (NAP) 720 begins to decode a video frame to an isolated memory region. The NAP 720 sends a request to a Secure Memory Allocation Service (SMAS) 730 with the request size (e.g., three frames) as argument.

At step 702, the SMAS 730 sends a request to the DMAS 310 with the requested size as argument. At step 703, the SMAS 730 goes through steps 42~47 in FIG. 4 to allocate a contiguous memory region which includes frames FN-2, FN-1 and FN. The contiguous memory region may be designated as a DMA buffer.

At step 704, the DMAS 310 reports the physical address of the DMA buffer to the SMAS 730. At step 705, the SMAS 730 sends a protect memory command to a Memory Protection Service (MPS) 740 with the physical address of the DMA buffer as argument.

At step 706, the MPS 740 protects the DMA buffer by adding an entry to the memory region filter table 650 and marking region FN-2~FN as secure access only. The step 706 includes a sub-step 76, at which the MPS 740 clears the DMA buffer with zeros, and notifies the Memory Allocator in Secure World (SMEMS) 750. The SMEMS 750 then appends the DMA buffer into its memory pool.

At step 707, the MPS 740 reports success to the SMAS 730. At step 708, the SMAS 730 reports success to a Normal World Application (NAP) 720. At step 709, the NAP 720 sends a decode command to the SAP 760 for decoding secure video frames. At step 710, the SAP 760 allocates a secure buffer from the SMEMS 750. At step 711, the SAP 760 notifies a decoder engine 770 to decode frames to the DMA buffer.

Figure 8:
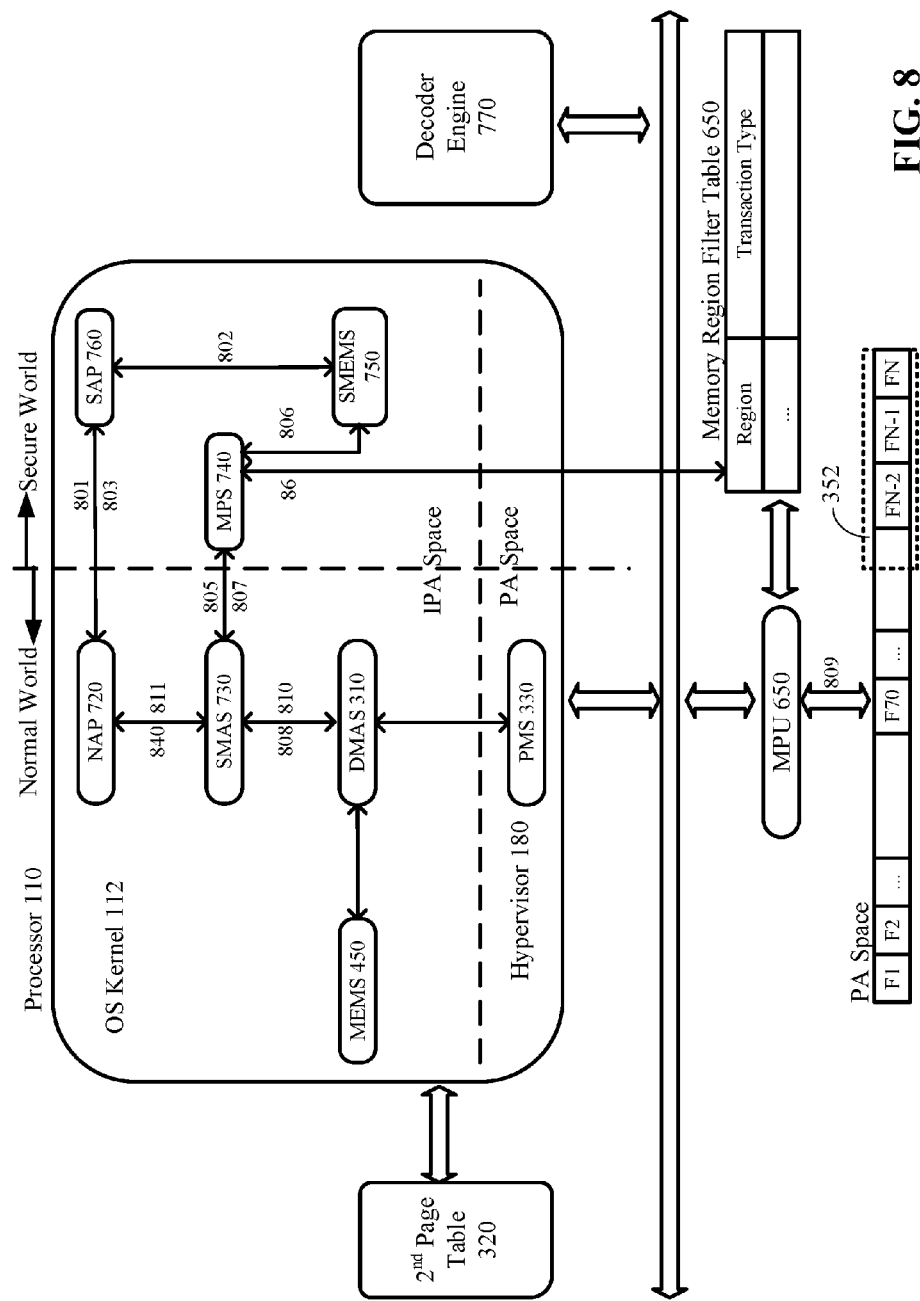
FIG. 8 illustrates a release process of a secure memory region according to one embodiment.

FIG. 8 is diagram illustrating a release process of a secure memory region based on the approach described in connection with FIG. 5 and FIG. 7 according to one embodiment. At step 801, the NAP 720 sends a stop a command to the SAP 760, signaling the SAP 760 to stop its operation. At step 802, the SAP 760 stops operation and releases the secure memory region back to the memory pool of the SMEMS 750. At step 803, the SAP 760 reports success to the NAP 720. At step 804, the NAP 720 sends a command to the SMAS 730 to release the secure memory region. At step 805, the SMAS 730 sends a command to the MPS 740 to de-isolate the secure memory region. At step 806, the MPS 740 requests the SMEMS 750 to remove the secure memory region from its memory pool, and clears the secure content in that memory region. The step 806 further includes a sub-step 86, which removes the entry of the secure memory region from the memory region filter table 650 after the secure content is cleared. At step 807, the MPS 740 reports success to the SMAS 730. At step 808, the SMAS 730 sends a command to the DMAS 310 to release the DMA buffer.

At step 809, the DMAS 310 follows steps 52~58 in FIG. 5 to release the DMA buffer. At step 810, the DMAS 310 reports success to the SMAS 730. At step 811, the SMAS 730 reports success to the NAP 720.

Figure 9:
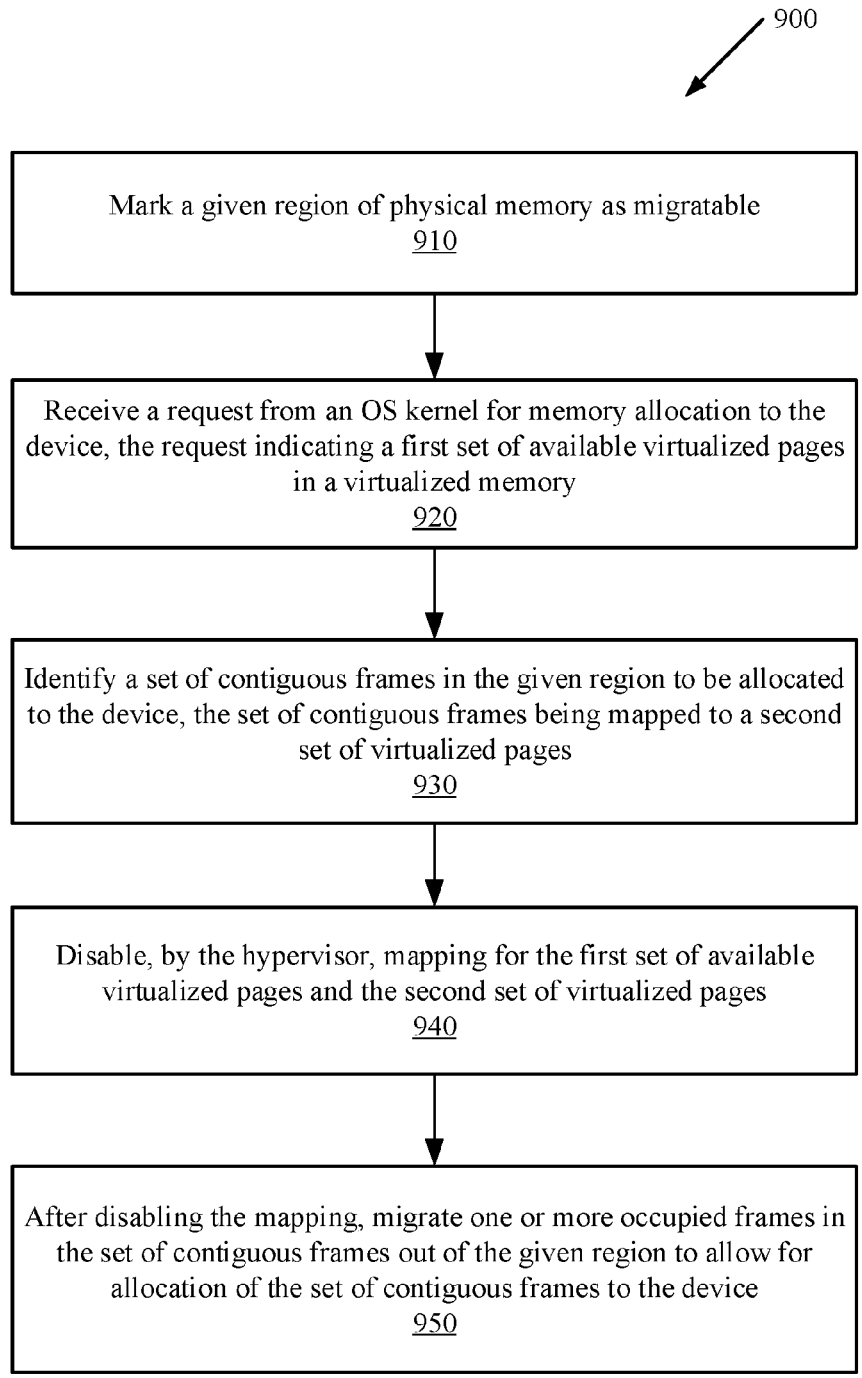
FIG. 9 is a flow diagram illustrating a method for allocating a contiguous physical memory space to a device according to one embodiment.

FIG. 9 is a flow diagram illustrating a method 900 for allocating a contiguous physical memory space to a device according to one embodiment. The method 900 may be performed by a hypervisor (e.g., the hypervisor 180 of FIG. 1) hosted by a system, such as the system 100 of FIG. 1, or the system 600 of FIG. 6. The method 900 begins with the hypervisor marks a given region of physical memory as migratable at step 910. At step 920, the hypervisor receives a request from an OS kernel for memory allocation to a device, the request indicating a first set of available virtualized pages in a virtualized memory. At step 930, the hypervisor identifies a set of contiguous frames in the given region to be allocated to the device, wherein the set of contiguous frames are mapped to a second set of virtualized pages. At step 940, the hypervisor disables mapping for the first set of available virtualized pages and the second set of virtualized pages. At step 950, after disabling the mapping, the hypervisor migrates one or more occupied frames in the set of contiguous frames out of the given region to allow for allocation of the set of contiguous frames to the device.

The operations of the flow diagram of FIG. 9 have been described with reference to the exemplary embodiments of FIGS. 1 and 6. However, it should be understood that the operations of the flow diagram of FIG. 9 can be performed by embodiments of the invention other than those discussed with reference to FIGS. 1 and 6, and the embodiments discussed with reference to FIGS. 1 and 6 can perform operations different than those discussed with reference to the flow diagram of FIG. 9. While the flow diagram of FIG. 9 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method of a hypervisor hosted by a computing system for allocating a contiguous physical memory space to a device, comprising:
    marking a given region of physical memory as migratable;
    receiving a request from an operating system (OS) kernel for memory allocation to the device, the request indicating a first set of available virtualized pages in a virtualized memory;
    identifying a set of contiguous frames in the physical memory to be allocated to the device, the set of contiguous frames being mapped to a second set of virtualized pages;
    disabling, by the hypervisor, mapping for the first set of available virtualized pages and the second set of virtualized pages; and
    after disabling the mapping, migrating one or more occupied frames in the set of contiguous frames out of the given region to allow for allocation of the set of contiguous frames to the device.

2. The method of claim 1, wherein marking the given region of physical memory as migratable further comprises:
    receiving information indicating that a contiguous region of virtualized memory is migratable; and
    mapping the contiguous region of virtualized memory to the given region of physical memory.

3. The method of claim 1, further comprising:
    initializing a page table to map each virtualized page in the virtualized memory to a corresponding frame in the physical memory, and wherein adjacent virtualized pages in the virtualized memory are mapped to adjacent frames in the physical memory.

4. The method of claim 1, further comprising:
    initializing a page table to map each virtualized page in the virtualized memory to a corresponding frame in the physical memory according to a predetermined mapping function.

5. The method of claim 1, wherein after migrating the one or more occupied frames, the method further comprises:
    marking the set of contiguous frames as allocated; and
    sending the OS kernel a physical address pointing to the set of contiguous frames.

6. The method of claim 1, wherein disabling the mapping further comprises:
    creating a source list of frames in the given region of physical memory, wherein the source list of frames match a buffer size indicated in the request;
    creating a destination list of frames corresponding to the first set of available virtualized pages; and
    removing all mapping from the virtualized memory to the physical memory for frames in at least one of the source list and the destination list.

7. The method of claim 6, further comprising:
    creating a no-migration list of frames including one or more frames that are in both the source list and the destination list; and
    migrating each frame in the source list to a frame in the destination list except for the one or more frames in the no-migration list.

8. The method of claim 1, wherein the request is initiated by a device driver associated with the device, and the OS kernel is operating on a virtual machine managed by the hypervisor.

9. The method of claim 1, further comprising:
marking the set of contiguous frames as a secure memory region.

10. The method of claim 9, further comprising:
adding an entry to a filtering table that marks secure memory regions in the physical memory, wherein the entry includes a physical address pointing to the set of contiguous frames.

11. The method of claim 9, wherein the request is initiated by an application executed on a virtual machine, and wherein the application is to cause the device to securely access the secure memory region.

12. A system operative to allocate a contiguous physical memory space to a device comprising:
one or more processors that host one or more virtual machines managed by a hypervisor;
a physical memory; and
one or more devices coupled to the one or more processors and the physical memory, wherein the hypervisor is operative to:
mark a given region of the physical memory as migratable;
receive a request from an operating system (OS) kernel for memory allocation to the device, the request indicating a first set of available virtualized pages in a virtualized memory;
identify a set of contiguous frames in the given region to be allocated to the device, the set of contiguous frames being mapped to a second set of virtualized pages;
disable mapping for the first set of available virtualized pages and the second set of virtualized pages; and
after disabling the mapping, migrate one or more occupied frames in the set of contiguous frames out of the given region to allow for allocation of the set of contiguous frames to the device.

13. The system of claim 12, wherein the hypervisor when marking the given region of physical memory as migratable is further operative to:
receive information indicating that a contiguous region of virtualized memory is migratable; and
map the contiguous region of virtualized memory to the given region of physical memory.

14. The system of claim 12, wherein the hypervisor is further operative to:
initialize a page table to map each virtualized page in the virtualized memory to a corresponding frame in the physical memory, and wherein adjacent virtualized pages in the virtualized memory are mapped to adjacent frames in the physical memory.

15. The system of claim 12, wherein the hypervisor is further operative to:
initialize a page table to map each virtualized page in the virtualized memory to a corresponding frame in the physical memory according to a predetermined mapping function.

16. The system of claim 12, wherein after migrating the one or more occupied frames, the hypervisor is further operative to:
mark the set of contiguous frames as allocated; and
send the OS kernel a physical address pointing to the set of contiguous frames.

17. The system of claim 12, wherein when disabling the mapping, the hypervisor is further operative to:
create a source list of frames in the given region of physical memory, wherein the source list of frames match a buffer size indicated in the request;
create a destination list of frames corresponding to the first set of available virtualized pages; and
remove all mapping from the virtualized memory to the physical memory for frames in at least one of the source list and the destination list.

18. The system of claim 17, wherein the hypervisor is further operative to:
create a no-migration list of frames including one or more frames that are in both the source list and the destination list; and
migrate each frame in the source list to a frame in the destination list except for the one or more frames in the no-migration list.

19. The system of claim 12, wherein the request is initiated by a device driver associated with the device, and the OS kernel is operating on a virtual machine managed by the hypervisor.

20. The system of claim 12, wherein the hypervisor is further operative to mark the set of contiguous frames as a secure memory region.

21. The system of claim 20, wherein the hypervisor is further operative to add an entry to a filtering table that marks secure memory regions in the physical memory, wherein the entry includes a physical address pointing to the set of contiguous frames.

22. The system of claim 20, wherein the request is initiated by an application executed on a virtual machine, and wherein the application is to cause the device to securely access the secure memory region.

* * * * *